May 2, 1961 J. HIRSHSTEIN 2,982,414
APPARATUS FOR THE SEPARATION OF GREASES, OILS
AND AQUEOUS EMULSIONS THEREOF
Filed Nov. 27, 1957 2 Sheets-Sheet 2

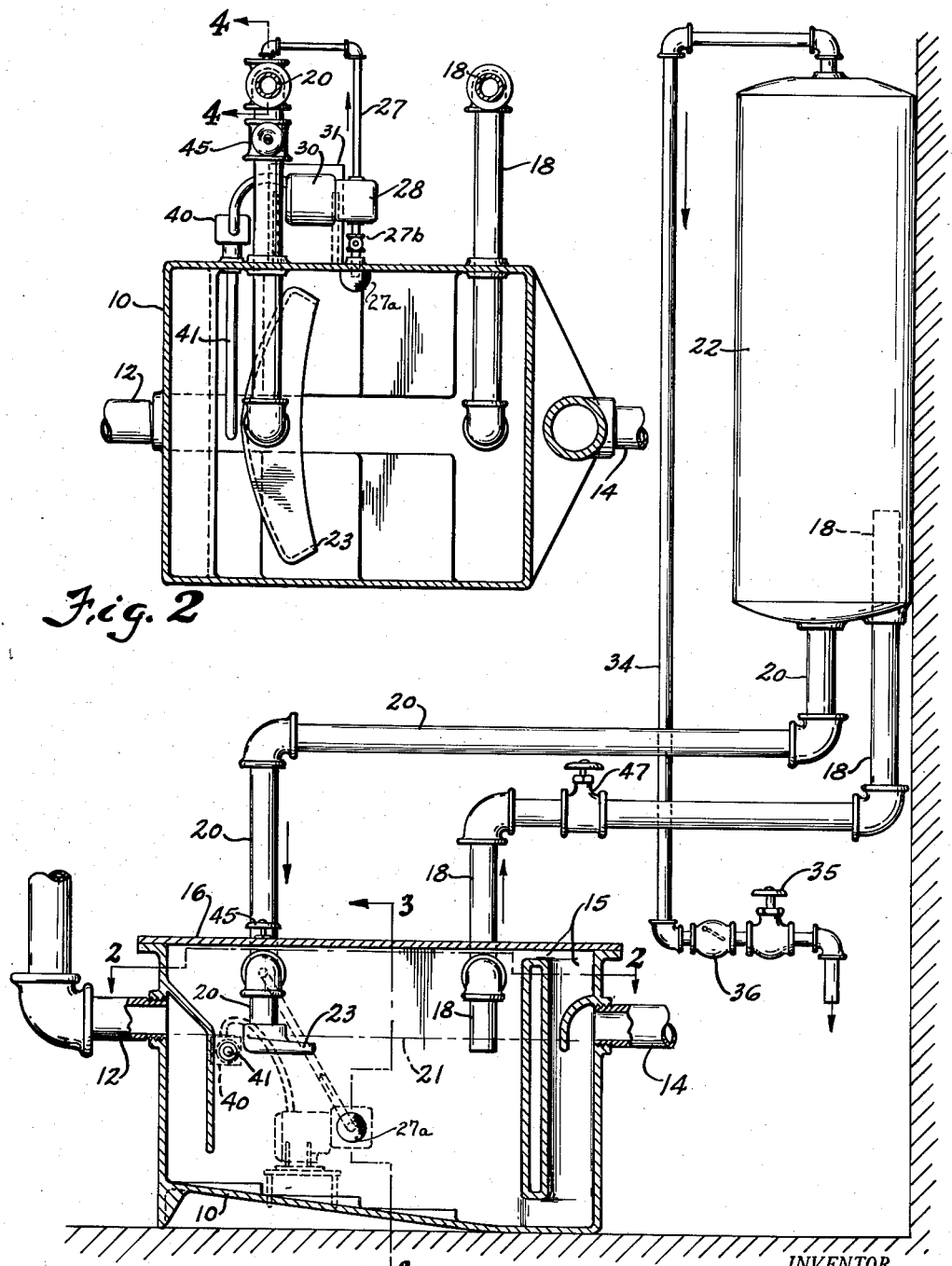

INVENTOR.
JOSEPH HIRSHSTEIN

United States Patent Office 2,982,414
Patented May 2, 1961

2,982,414

APPARATUS FOR THE SEPARATION OF GREASES, OILS AND AQUEOUS EMULSIONS THEREOF

Joseph Hirshstein, Miami Beach, Fla., assignor to Ruth R. Newman, Chicago, Ill.

Filed Nov. 27, 1957, Ser. No. 699,351

7 Claims. (Cl. 210—149)

This invention is directed to skimming systems for grease and oil interceptors such as are used in the waste water lines of dish washers, sinks, garages and industrial lines.

The general object of the present invention is the provision of a skimmer system combined with an interceptor of the above referred to type which will meet the plumbing code requirements while being efficient in the extraction of the greases, oils and emulsions thereof contained in waste water effluents.

A more specific object of the present invention is the provision of a recirculating system combined with the interceptor to remove the greases, oils and emulsions thereof immediately following their separation from the effluent.

A still further object is the provision of a skimmer system for the interceptor which will be responsive to the temperature of the effluent in its cyclical operation.

Other objects of the invention will become apparent to those skilled in the art from the following description thereof wherein reference is made to the accompanying drawings showing a preferred embodiment thereof. The essential characteristics are summarized in the claims.

In the drawings Figure 1 is an elevational view of my apparatus with the interceptor part of the apparatus shown in central cross section;

Figure 2 is a cross sectional plan view of the interceptor taken along the line 2—2 of Figure 1;

Figure 3:
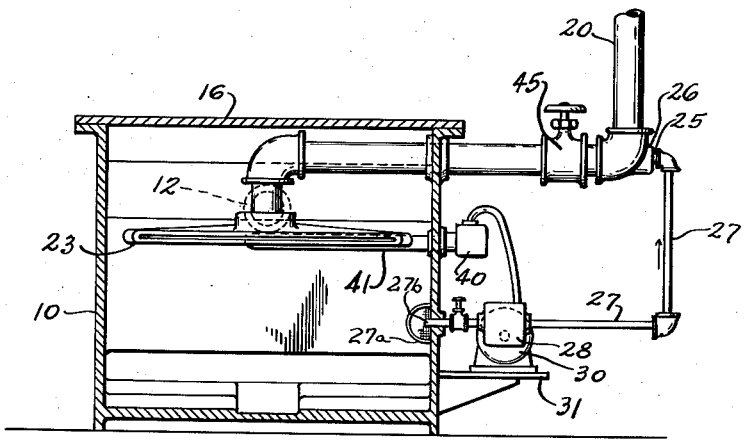
Figure 3 is a transverse section taken through the interceptor structure substantially along planes indicated by the line 3—3 in Figure 1.
Figure 4:
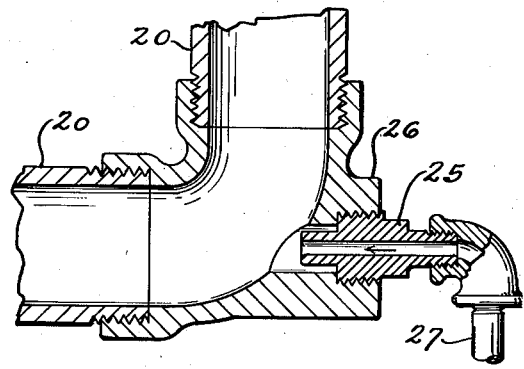
Figure 4 is an enlarged cross section of the injector apparatus taken along the line 4—4 of Figure 2; and, Figure 5 is a diagram illustrating one manner of thermostatic control of the pump motor comprising part of the apparatus.
Figure 5:
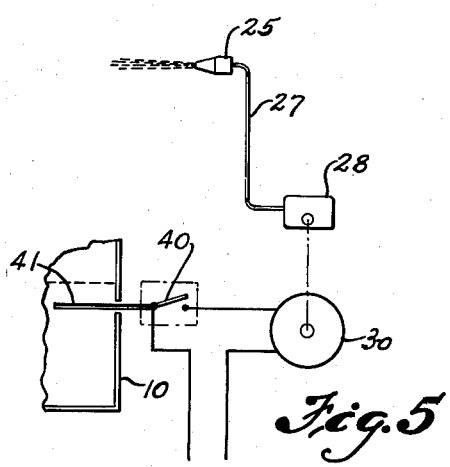

Skimmer systems for interceptors have been devised wherein a negative pressure chamber, i.e., a chamber or vessel having a prevailing pressure therein less than atmospheric, is located above the interceptor chamber of the interceptor and connected to the interceptor by recirculating lines so that the separated grease or oil is raised to an elevated chamber from where it may be drawn off through a balanced or trapped column. Such a system can operate on a thermo-cycle principle but the circulating action is slow and heat losses gradually decrease the circulation and at times before all of the greases and oils have been elevated to the upper separating chamber.

In the present invention I propose to expedite the circulating action between the upper and lower chambers by the use of a motor driven pump which will draw waste water from the interceptor chamber and inject such waste water into the downstream line of the circulating system. Suitable valving and an injector means in the pump line and in the recirculating lines are used for priming the upper chamber, and thereafter the action of the downstream is directed toward the floating greases and oils on the top surface of the waste water within the separator to flow the grease toward the entrance to the upstream line.

Current use of detergents as cleansing agents instead of soap brings about the presence of grease and oil emulsions in the effluent. A stratum of emulsions of the greases and oils separates and floats on the waste water below the stratum of separated greases or oils and it is desired to prevent the escape of the emulsion into the waste line comprising the outlet of the interceptor. This is particularly true where the waste line leads to a septic tank since the emulsion has a tendency to interfere with the proper functioning of the septic tank.

In the instant invention it is practical to recirculate repeatedly the emulsion between separator and interceptor until the emulsion deteriorates or breaks down without involving recirculation of the separated greases and oils. To accomplish this recirculation in a more rapid manner than otherwise obtained by convection, I utilize a relatively low level line associated with the interceptor structure and a motor driven pump with an injector disposed in the lower region of the downstream line which expedites the downstream flow. The exit or lower end of the downstream line may terminate slightly below the bottom level of the stratum of greases and oils and be directed to discharge toward the lower end of the upstream line, whereby the greases and oils separated within the interceptor chamber will be moved toward the intake end of the upstream line. The motor and pump are supported by the interceptor structure, and the injector line is confined to a minimum length to avoid heat losses.

The power line to the pump motor may be controlled, if desired, by a thermostatic switch disposed within the interceptor basin at a location which will afford quick response to the warm or hot influent entering the interceptor basin thus making the pump, motor and injector intermittent in operation and at a time when the greases and oils are in their most fluid condition. The motor, however, may be controlled by a manually operated switch.

Referring to the drawings in Figures 1 and 2, I show a grease, oil and emulsion interceptor having an inlet 12 and an outlet 14 at opposite ends of a rectangular basin or chamber structure comprising the influent separating chamber of the system. The normal or quiescent water level is determined in the separating chamber by the height of the outlet 14. Such interceptors are in general use, and the top region of the separating chamber is vented to the atmosphere with a by-pass structure 15 in a well-known manner. The practice has been to open the bolted cover 16 and dip out the separated grease and oils. However, floating solids such as food particles putrefy and if the interceptor is not serviced frequently the grease interceptor becomes a source of considerable annoyance thus inviting further neglect. Also the emulsions of greases and oils accumulate below the grease layer until the emulsions begin to escape through the outlet leg 14.

I propose to use a known skimmer circuit, comprising an elevated tank with upstream and downstream lines, whereby the greases and oils rise in the upstream line and displace an equal volume of water from the tank downwardly in the downstream line, but expedite the flow rate in the downstream line by the use of a motor driven pump and injector while using the water and, in some instances, the emulsion present in the interceptor as the source of liquids for the injector.

In Figures 1 and 2 are shown an upstream or skimmer line 18 extending upwardly into a separator tank 22 positioned above the interceptor structure 10. The lower end of line 18 terminates slightly below the normal water level of the interceptor as indicated by the horizontal dot and dash line 21. The downstream line 20 terminates at the bottom thereof within the interceptor chamber below the normal water level, and is provided with a flow distributor 23 which directs the downstream toward the locus of the upstream inlet, thereby to flow the separated grease and oils toward the skimming inlet end of the upstream line 18. If the outlet end of the downstream line 20 is located a considerable distance below the normal water level, i.e., at a location in the body of liquids within the interceptor, a convection cycle up the upstream line 18 and tank 22 and downstream line 20 will take place due to the difference in temperatures at the two levels of the upstream inlet and downstream outlet. While the rate of flow of the convection cycle is satisfactory in many instances, there are occasions when the cycle ceases due to heat losses before all of the greases and oils are skimmed out of the interceptor chamber.

I provide an injector 25 in an elbow 26 of the downstream line to increase the flow of the upstream downstream cycle. This injector is located in the region of the interceptor structure to keep the over-all length of the injector line 27 leading from pump 28, and of the pump inlet portion 27b thereof from screened inlet 27a, relatively short. The motor 30 for driving the pump may be mounted with the pump on a bracket 31 attached to the interceptor structure.

A valve 45 is located in the downstream line 20 between the lower end of the downstream line 20 and the injector 25, and a valve 47 is located in the upstream line. A drawoff line 34 with valve 35 leads downwardly from the top of the tank. By closing valves 47 and 45 while valve 35 is open, the tank 22 can be primed or filled with liquid from the interceptor chamber upon operation of the pump. Check valve 36 serves to maintain the column 34 when drawoff of accumulated greases and oils in tank 22 is being effected, and the tank can be stripped of such accumulation in the same manner as when the tank is being initially primed by pump action, or the drawoff may be continuous.

The foregoing described apparatus can fulfill its functions by operation of a manual switch (not shown) in the power line to the motor. The operation of the apparatus also can be made automatic upon the ingress of hot influent, such as a discharge from a dish washer, into the interceptor by the use of a thermostatically responsive switch 40 with the thermo-responsive element 41, preferably located in the region of the inlet end of the interceptor. Such a control would be set to continue the operation of the motor after the greases and oils had been skimmed from the interceptor, thereby effecting a prolonged recirculation of the emulsions of the greases and oils to enhance the gradual breakdown thereof. Hence the setting of the thermostatic control of the motor and pump operation and the use of the injector to speed up the grease skimming action thus makes available a longer period of emulsion recirculation before the motor is stopped by a drop in temperature of the liquid in the interceptor chamber.

I am aware of the use of a pump in the described environment of grease skimming requiring an extended line between the tank and interceptor and involving the use of a reversing motor to prime the tank and to which no claim is made here. But I do claim the injector located in the downstream line for the purposes herein before explained and, also, the thermostatic control of the motor, the periods of operation of which can be dependent upon the temperature of the liquids within the interceptor.

I claim:

1. In combination a grease and oil interceptor having an outlet determining the static water level of the interceptor chamber and an inlet, a grease and oil separator vessel having a chamber disposed above the interceptor, an upflow line extending between the chamber of the interceptor and the separator chamber, the bottom end of the upflow line terminating below the static water level of the interceptor, a downflow line extending from the bottom of the separator into the interceptor chamber and terminating therein below the static water level in the interceptor chamber, a stream spreading structure on the bottom end of the downflow line directing the downflow stream toward the lower end of the upflow line, a grease and oil draw-off line extending downwardly from the top of the separator chamber and including in the bottom region thereof a check valve, a power driven pump, a pump line leading from the interceptor chamber below the static water level of the interceptor chamber to the pump and from the pump to the downflow line, and an injector disposed in the said downflow line and connected to the pump line thereby to increase the rate of flow of the downflow stream in the downflow line.

2. In combination a grease and oil interceptor having an outlet determining the static water level of the interceptor chamber and an inlet, a grease and oil separator vessel having a chamber disposed above the interceptor, an upflow line extending between the chamber of the interceptor and the separator chamber, the bottom end of the upflow line terminating below the static water level of the interceptor, a downflow line extending from the bottom of the separator into the interceptor chamber and terminating therein below the static water level in the interceptor chamber adjacent the inlet end of the interceptor, a power driven pump, a motor for driving the pump, a pump line leading from the interceptor chamber below the static water level of the interceptor chamber to the pump and from the pump to the downflow line, an injector disposed in the said downflow line and connected to the pump line thereby to increase the downflow stream in the downflow line, a thermostatically controlled switch controlling the operation of the pump motor, and a thermal-responsive element located in the interceptor chamber adjacent the inlet end of the interceptor and adapted to actuate said switch.

3. In combination a grease and oil interceptor having an outlet determining the static water level of the interceptor chamber and an inlet, a grease and oil separator vessel having a chamber disposed above the interceptor, an upflow line extending between the chamber of the interceptor and the separator chamber, the bottom end of the upflow line terminating below the static water level of the interceptor adjacent the outlet end of the interceptor, a downflow line extending from the bottom of the separator into the interceptor chamber and terminating therein below the static water level in the interceptor chamber adjacent the inlet end of the interceptor, a power driven pump below the static liquid level in the interceptor, a pump line leading from the interceptor chamber below the static water level of the interceptor chamber to the pump and from the pump to the downflow line, an injector disposed in the said downflow line and connected to the pump line thereby to increase the rate of flow of the downflow stream in the downflow line and a shut off valve located between the lower end of the downstream line and the injector.

4. In combination a grease and oil interceptor having an outlet determining the static water level of the interceptor chamber, a grease and oil separator vessel having a chamber disposed above the interceptor, an upflow line extending between the chamber of the interceptor and the separator chamber, the bottom end of the upflow line terminating slightly below the static water level of the interceptor, a shut off valve in the upflow line, a downflow line extending from the bottom of the separator into the interceptor chamber and terminating therein below the static water level in the interceptor chamber, a power driven pump, a pump line leading from the interceptor chamber from below the static water level of the interceptor chamber to the pump and from the pump to the downflow line, an injector disposed in the said downflow line and connected to the pump line thereby to increase the downflow in the downflow line, a shut off valve disposed in the downflow line between the injector and the outlet end of the downflow line whereby the upper separator chamber may be primed with waste water pumped from the interceptor when said valves are closed, and a grease and oil draw-off line extending downwardly from the top of the separator chamber and including near the bottom thereof a check valve.

5. In combination a grease and oil interceptor having an outlet determining the static water level of the interceptor chamber and an inlet, a grease and oil separator vessel having a chamber disposed above the interceptor, an upflow line extending between the chamber of the interceptor and the separator chamber, the bottom end of the upflow line terminating slightly below the static water level of the interceptor, a downflow line extending from the bottom of the separator into the interceptor chamber and terminating therein below the static water level in the interceptor chamber, a power driven pump disposed below the static liquid level in the interceptor, a pump line leading from the interceptor chamber below the static water level of the interceptor chamber to the pump and from the pump to the downflow line and an injector disposed in the said downflow line and connected to the pump line thereby to increase the rate of flow in the downflow stream in the downflow line.

6. In combination a grease and oil interceptor having an outlet determining the static water level of the interceptor chamber and an inlet, a grease and oil separator vessel having a chamber disposed above the interceptor, an upflow line extending between the chamber of the interceptor and the separator chamber, the bottom end of the upflow line terminating slightly below the static water level of the interceptor adjacent the outlet end of the interceptor, a downflow line extending from the bottom of the separator into the interceptor chamber, a stream spreader on the bottom of the downflow line and disposed below the static water level in the interceptor chamber adjacent the inlet end of the interceptor, said spreader and its outlet directed toward the bottom of the upflow line, a power driven pump located below the static liquid level in the interceptor, a pump line leading from the interceptor chamber below the static water level of the interceptor chamber to the downflow line, and an injector disposed in the said downflow line and connected to the pump line thereby to increase the rate of flow of the downflow stream in the downflow line.

7. In combination a grease and oil interceptor having an interceptor chamber with an outlet determining the static water level of the interceptor chamber and having an inlet, a grease and oil separator vessel having a chamber disposed above the interceptor chamber, an upflow line extending between the chamber of the interceptor and the separator chamber, the bottom end of the upflow line terminating below the static water level of the chamber of the interceptor, a downflow line extending from the separator chamber into the interceptor chamber and terminating therein below the static water level in the interceptor chamber adjacent the inlet end of the interceptor, a power driven pump, a motor for driving the pump, a pump line leading from the interceptor chamber below the static water level of the interceptor chamber and connected into one of said lines thereby to increase the liquid flow in the downflow line, a thermostatically controlled switch controlling the operation of the pump motor, and a thermal-responsive element located in the interceptor chamber below the static water level of the interceptor adapted to actuate said switch.

References Cited in the file of this patent

UNITED STATES PATENTS

| 2,338,986 | Waterman | Jan. 11, 1944 |
| 2,346,005 | Bryson | Apr. 4, 1944 |
| 2,502,142 | Gehle | Mar. 28, 1950 |
| 2,747,736 | Mobley | May 29, 1956 |
| 2,799,645 | Musgrove | July 16, 1957 |